US007946561B2

(12) United States Patent
Nemoto et al.

(10) Patent No.: US 7,946,561 B2
(45) Date of Patent: May 24, 2011

(54) ANTI-VIBRATION SUPPORT SYSTEM FOR ENGINE

(75) Inventors: Hirotomi Nemoto, Saitama (JP); Atsushi Abe, Saitama (JP); Manabu Sekine, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 645 days.

(21) Appl. No.: 10/784,891

(22) Filed: Feb. 24, 2004

(65) Prior Publication Data
US 2004/0232307 A1 Nov. 25, 2004

(30) Foreign Application Priority Data

Mar. 4, 2003 (JP) .................................. 2003-056682

(51) Int. Cl.
*F16F 5/00* (2006.01)
(52) U.S. Cl. ......... 267/140.14; 267/140.13; 267/140.15; 248/638; 248/562; 123/352; 123/355
(58) Field of Classification Search ................. 248/638, 248/637, 562, 566, 634, 646; 267/140.14, 267/140.13, 140.15; 123/349, 350, 352, 123/355, 406.29
See application file for complete search history.

(56) References Cited

U.S. PATENT DOCUMENTS

| 5,163,400 A * | 11/1992 | Yoshioka et al. ............ 123/361 |
| 5,647,579 A * | 7/1997 | Satoh ...................... 267/140.14 |
| 5,939,625 A | 8/1999 | Torii et al. ................... 73/118.1 |
| 6,401,684 B2 * | 6/2002 | Hori et al. ................. 123/198 F |
| 6,406,010 B1 * | 6/2002 | Yano et al. ............... 267/140.14 |
| 6,422,546 B1 * | 7/2002 | Nemoto et al. .......... 267/140.14 |
| 6,427,662 B2 * | 8/2002 | Tanaya et al. ............ 123/406.29 |
| 6,459,981 B1 * | 10/2002 | Gimmler et al. ............... 701/93 |
| 6,527,262 B2 * | 3/2003 | Hagino et al. ........... 267/140.14 |
| 6,641,120 B2 * | 11/2003 | Nemoto .................... 267/140.14 |
| 7,025,342 B2 * | 4/2006 | Nemoto et al. .......... 267/140.14 |

FOREIGN PATENT DOCUMENTS

| JP | 06-042579 | 2/1994 |
| JP | 06-193477 | 7/1994 |
| JP | 7-42783 | 2/1995 |
| JP | 2001-001766 A | 1/2001 |
| JP | 3244457 B2 | 10/2001 |
| JP | 2002-097973 A | 4/2002 |

* cited by examiner

*Primary Examiner* — Terrell Mckinnon
*Assistant Examiner* — Todd M. Epps
(74) *Attorney, Agent, or Firm* — Arent Fox LLP

(57) ABSTRACT

An anti-vibration support system for an engine, comprising an active anti-vibration supporting device including an elastic member adapted to receive a vibration of the engine; a liquid chamber, wherein at least a portion of a wall surface of said liquid chamber is defined by said elastic member; a movable member adapted to change a volume of said liquid chamber; and an actuator that uses an electromagnetic force to drive said movable member, wherein the vibration of the engine is prevented from being transmitted to a vehicle body frame by controlling a supply of electric current to said actuator, and wherein operation of said active anti-vibration supporting device is prohibited when an abnormality in an operational state of the engine is detected.

12 Claims, 7 Drawing Sheets

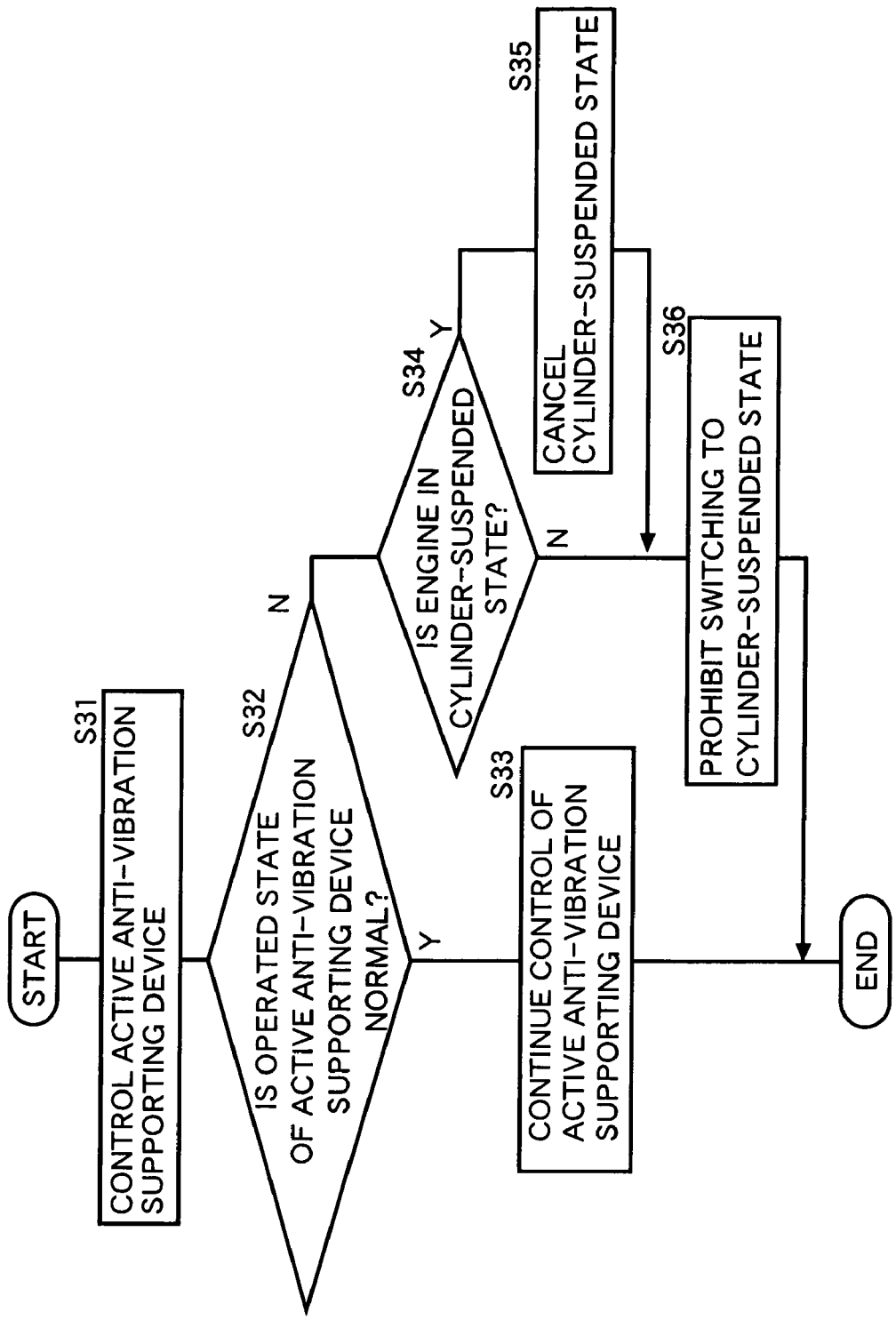

ANTI-VIBRATION SUPPORT SYSTEM FOR ENGINE

BACKGROUND OF THE INVENTION

1. Field of the Invention

The present invention relates to an anti-vibration support system for an engine wherein transmission of vibrations from an engine to a vehicle body frame is suppressed by controlling a supply of electric current to an actuator of an active anti-vibration supporting device.

2. Description of Related Art

An anti-vibration supporting device is disclosed in Japanese Patent Application Laid-open No. 7-42783. The disclosed anti-vibration supporting device varies a spring constant by applying electric current to an actuator to vibrate a movable member. The disclosed device exhibits effective anti-vibration performance in various ranges of engine rotational speed by previously storing a relationship between a peak current value and a phase of the applied electric current in a map to set the spring constant. Accordingly, an appropriate peak current value and phase of electric current to be applied to the actuator is obtained from the map, which corresponds to the engine rotational speed.

However, when an abnormality is generated in the engine during operation of the active anti-vibration supporting device and results in a sudden increase in the amount of vibration, the active anti-vibration supporting system is forced to operate in excess of a limit of the system's ability in an attempt to suppress the vibration. As a result, there exists a possibility an abnormality is generated in the active anti-vibration supporting system itself, or the durability of the active anti-vibration supporting system is decreased. In the case where an abnormality is generated in the active anti-vibration supporting system itself, if the operational state of the engine is switched to an operational state in which an amount or level of vibration is increased, the active anti-vibration supporting system may not be able to suppress the vibration, resulting in an increase of noise and/or the amount or level of vibration.

SUMMARY OF THE INVENTION

According to an aspect of the present invention, when an abnormality is generated in the active anti-vibration supporting device or the engine, a reduction in durability of the active anti-vibration supporting device is prevented, and increases in noise and vibration are minimized.

According to a feature of the present invention, there is provided an anti-vibration support system for an engine, which includes an active anti-vibration supporting device having an elastic member adapted to receive the vibration of an engine and a liquid chamber. At least a portion of a wall surface of the liquid chamber is formed or defined by the elastic member. A movable member, which is adapted to change the volume of the liquid chamber, is driven by an actuator. The actuator is driven by an electromagnetic force. As a result, vibrations from the engine are prevented from being transmitted to a vehicle body frame by controlling a supply of electric current to the actuator. Furthermore, operation of the active anti-vibration supporting device is prohibited upon detection of an abnormality in an operational state of the engine.

When transmission of engine vibrations to the vehicle body frame is suppressed by controlling the supply of electric current to the actuator, if an abnormality is detected in the operational state of the engine, the active anti-vibration supporting device is prohibited from operating. Thus, it is possible to prevent the active anti-vibration supporting device from needlessly operating in a situation where the active anti-vibration supporting device is unable to suppress vibration of the engine. Furthermore, the actuator is prevented from needlessly using and wasting electric power. Moreover, the durability of the active anti-vibration supporting device is not compromised.

According to another feature of the present invention, there is provided an anti-vibration support system for an engine, which includes an active anti-vibration supporting device having an elastic member that is adapted to receive the vibration of a cylinder-suspendable type of engine and a liquid chamber. At least a portion of a wall surface of the liquid chamber is formed or defined by the elastic member. A movable member, which is adapted to change the volume of the liquid chamber, is driven by an actuator. The actuator is driven by an electromagnetic force. As a result, vibrations from the engine are prevented from being transmitted to a vehicle body frame by controlling a supply of electric current to the actuator. Furthermore, the cylinder suspension of the engine is prohibited upon detection of an abnormality in an operational state of the active anti-vibration supporting device.

When transmission of engine vibrations to the vehicle body frame is suppressed by controlling the supply of electric current to the actuator, if an abnormality is detected in the operational state of the active anti-vibration supporting device, the cylinder suspension of the engine is prohibited. Therefore, it is possible to avoid a situation wherein an increase of engine vibrations due to the cylinder suspension is not able to be suppressed by the active anti-vibration supporting device.

A first elastic member in an embodiment described below corresponds to the elastic member of the present invention. Also, a first liquid chamber in the below-described embodiment corresponds to the liquid chamber of the present invention.

The above and other aspects, features, and advantages of the present invention will become apparent from the following description of a preferred embodiment, taken in conjunction with the accompanying drawings.

BRIEF DESCRIPTION OF THE DRAWINGS

FIG. 7 is a flowchart showing a technique for controlling the engine when an abnormality is generated during an operational state of the active anti-vibration supporting device.

DETAILED DESCRIPTION OF THE PREFERRED EMBODIMENT

Figure 1:
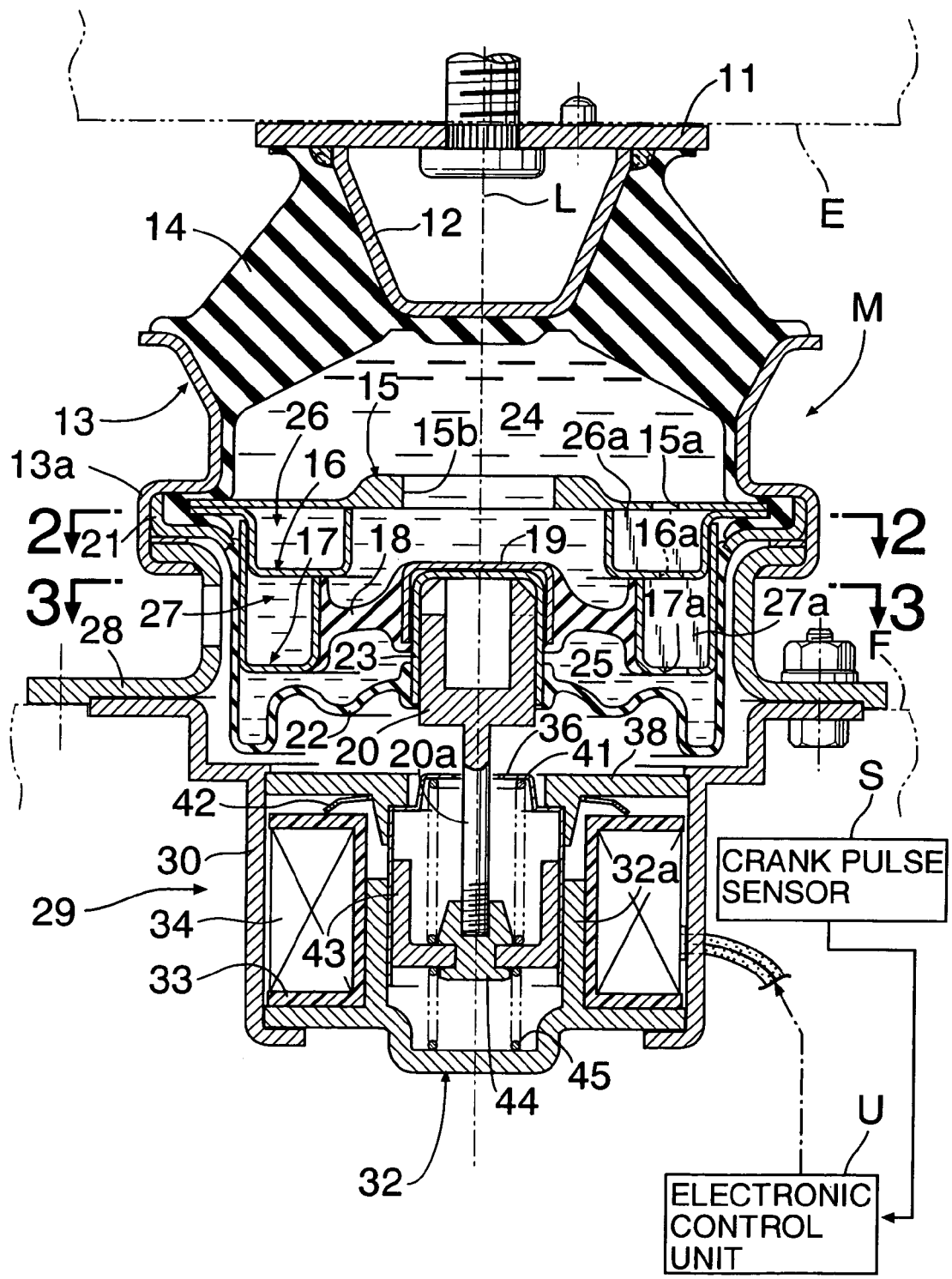
FIG. 1 is a cross-sectional side view of an active anti-vibration supporting device according to an embodiment of the present invention.
Figure 2:
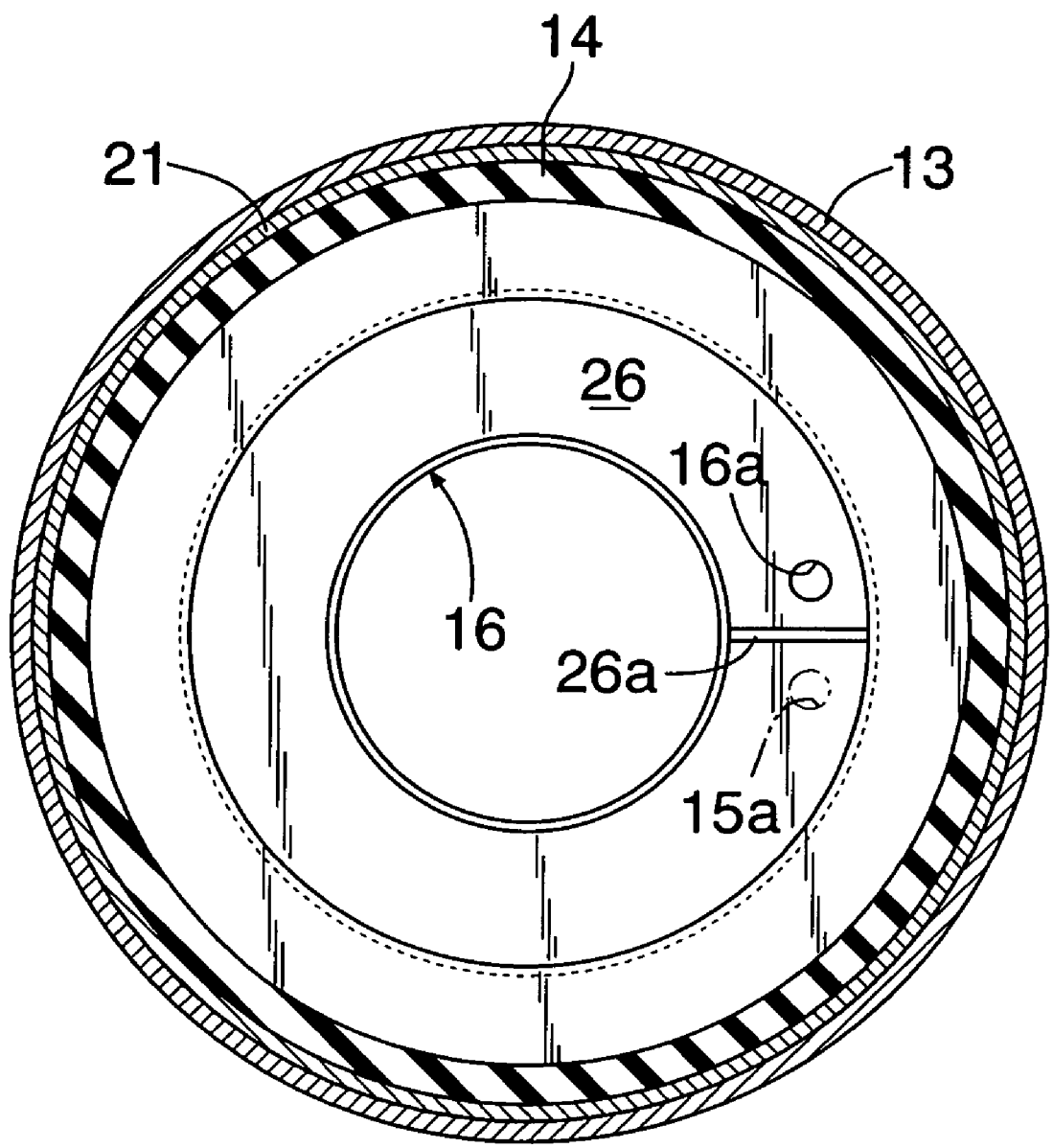
FIG. 2 is a cross-sectional view taken along line 2-2 in FIG. 1.
Figure 3:
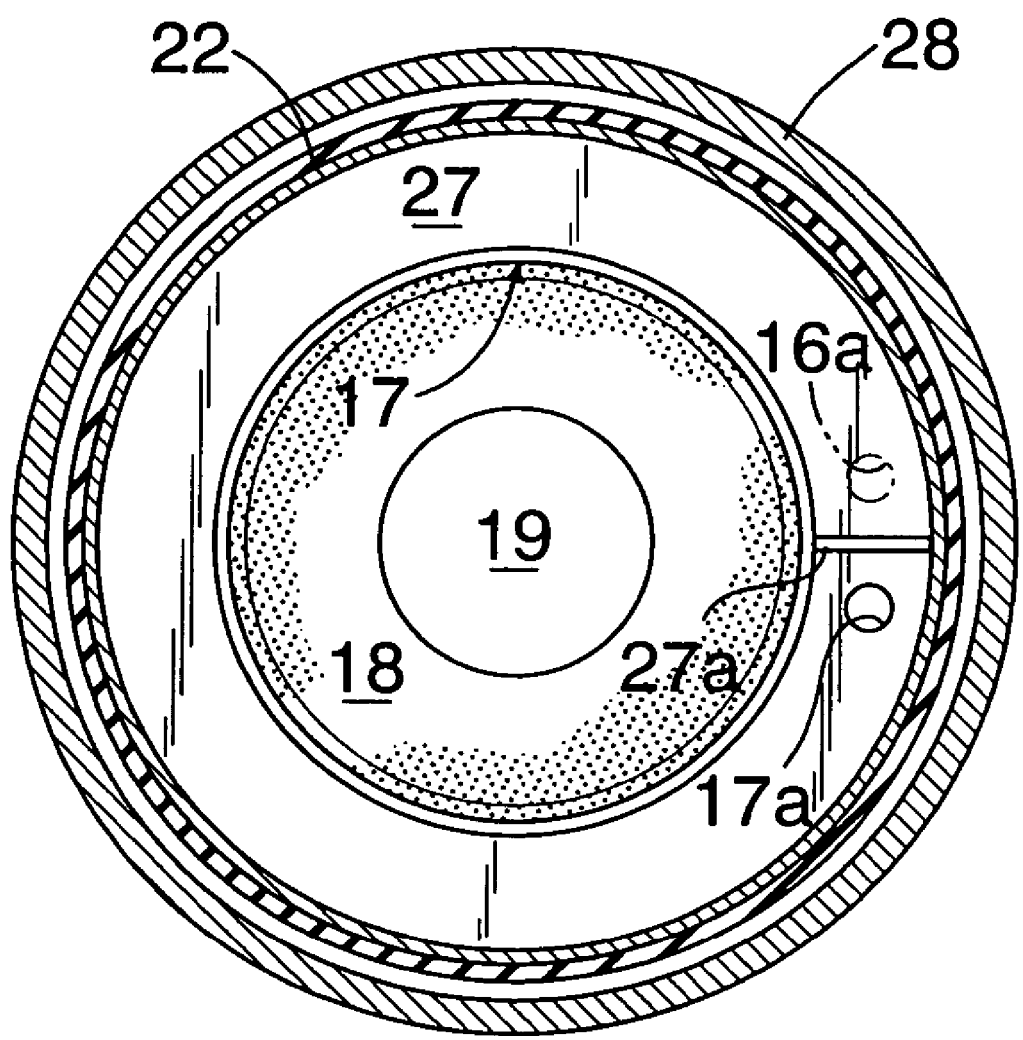
FIG. 3 is a cross-sectional view taken along line 3-3 in FIG. 1.
Figure 4:
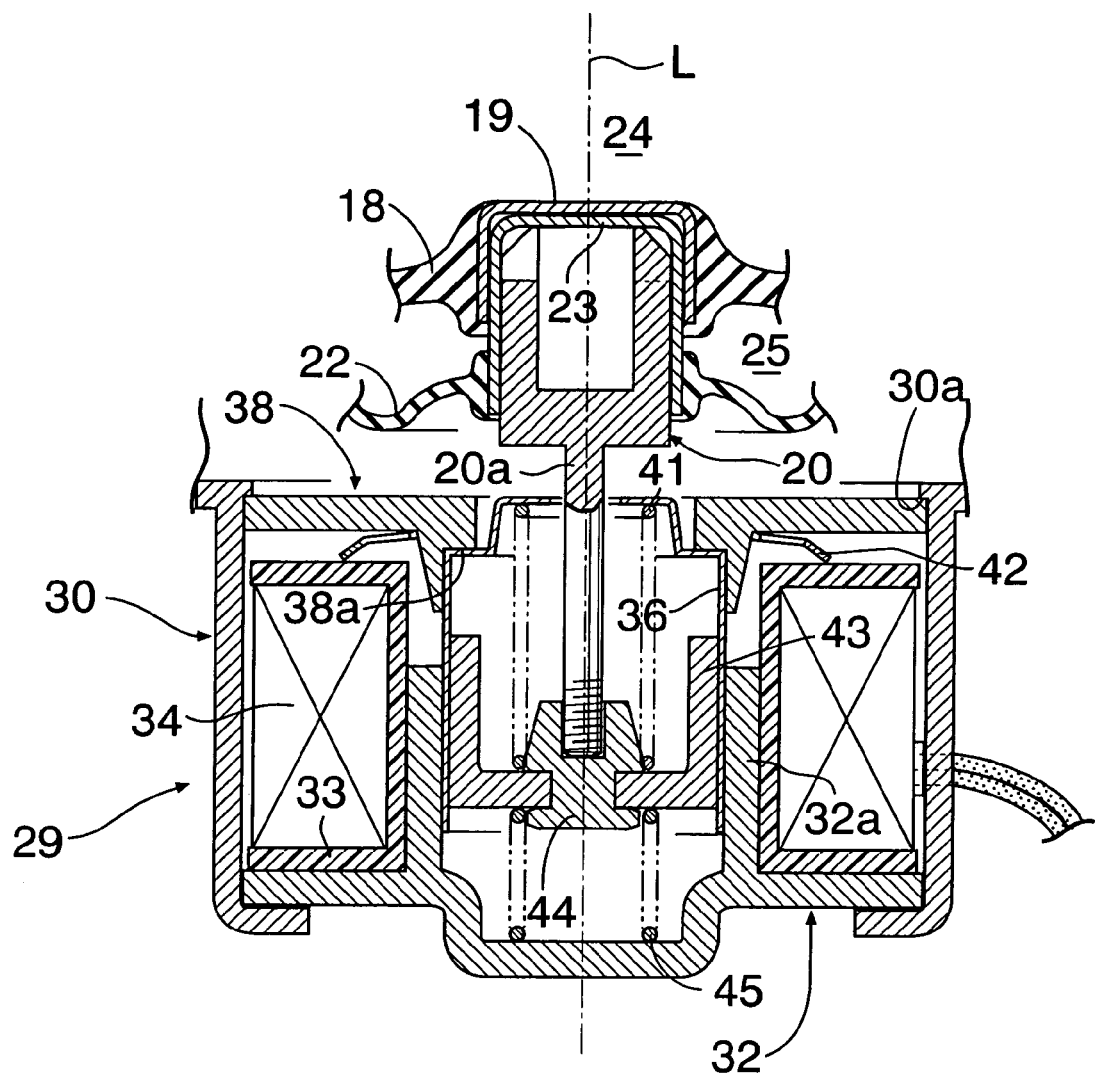
FIG. 4 is an enlarged cross-sectional side view of essential portions of the device shown in FIG. 1.

The present invention will now be described by way of a preferred embodiment with reference to the accompanying drawings.

An active anti-vibration supporting device M shown in FIGS. 1 to 4 resiliently supports a cylinder-suspendable type of an engine. E on a vehicle body frame of an automobile. The active anti-vibration supporting device M is controlled by an electronic control unit U, which is connected to a crank pulse sensor S that detects a crank pulse output with the rotation of a crankshaft of the engine E. The crank pulse is output thirty six times per rotation of the crankshaft, namely, the crank pulse is output once for every crank angle of 10°.

The active anti-vibration supporting device M has a structure substantially symmetric relative to an axis L, and includes an inner tube 12 welded to a plate-shaped mounting bracket 11 coupled to the engine E. An outer tube 13 is coaxially disposed around an outer periphery of the inner tube 12. An upper end and a lower end of a first elastic member 14, which is formed from a thick rubber, are bonded to the inner tube 12 and the outer tube 13 by vulcanization bonding, respectively. A disk-shaped first orifice-defining member 15 having an opening 15b at a central portion, a second orifice-defining member 16 formed into an annular shape having a tub-shaped or U-shaped section with an open upper surface, and a third orifice-defining member 17 formed into an annular shape also having a tub-shaped or U-shaped section with an open upper surface, are integrally connected together by welding. Outer peripheral portions of the first orifice-defining member 15 and the second orifice-defining member 16 are superposed on each other and fixed to a crimping portion 13a provided at a lower portion of the outer tube 13.

An outer periphery of a second elastic member 18, which is formed from a membrane-shaped rubber, is fixed to an inner periphery of the third orifice-defining member 17 by vulcanization bonding. A cap member 19 is fixed to an inner periphery of the second elastic member 18 by vulcanization bonding. The cap member 19 is also fixed to a vertically movable member 20 by press-fitting, the movable member 20 being disposed along the axis L. An outer periphery of a diaphragm 22 is fixed, by vulcanization bonding, to a ring member 21 that is fixed to the crimping portion 13a of the outer tube 13. A cap member 23 is fixed to an inner periphery of the diaphragm 22 by vulcanization bonding, and is fixed to the movable member 20 by press-fitting.

Thus, a first liquid chamber 24, which sealedly contains liquid therein, is defined between the first elastic member 14 and the second elastic member 18. A second liquid chamber 25, which sealedly contains liquid therein, is defined between the second elastic member 18 and the diaphragm 22. The first liquid chamber 24 and the second liquid chamber 25 communicate with each other through an upper orifice 26 and a lower orifice 27 defined by the first, second, and third orifice-defining members 15, 16 and 17.

The upper orifice 26 is an annular passage defined between the first orifice-defining member 15 and the second orifice-defining member 16. A communication bore 15a is formed in the first orifice-defining member 15 on one side of a partition wall 26a provided at a portion of the upper orifice 26. A communication bore 16a is formed in the second orifice-defining member 16 on the other side of the partition wall 26a. Therefore, the upper orifice 26 is substantially defined by a circle extending from the communication bore 15a in the first orifice-defining member 15 to the communication bore 16a in the second orifice-defining member 16 (see FIG. 2).

The lower orifice 27 is an annular passage defined between the second orifice-defining member 16 and the third orifice-defining member 17. The communication bore 16a is formed in the second orifice-defining member 16 on one side of a partition wall 27a provided in a portion of the lower orifice 27. A communication bore 17a is formed in the third orifice-defining member 17 on the other side of the partition wall 27a. Therefore, the lower orifice 27 is substantially defined by another circle extending from the communication bore 16a in the second orifice-defining member 16 to the communication bore 17a in the third orifice-defining member 17 (see FIG. 3).

From the forgoing, the first liquid chamber 24 and the second liquid chamber 25 communicate with each other through the upper orifice 26 and the lower orifice 27, which are connected in series to each other.

An annular mounting bracket 28, which is used to fix the active ant-vibration supporting device M to the vehicle body frame F, is fixed to the crimping portion 13a of the outer tube 13. An actuator housing 30 is welded to a lower surface of the mounting bracket 28 and defines an outer shell of an actuator 29.

A yoke 32 is fixed to a lower portion of the actuator housing 30, and a coil 34, which is wound around a bobbin 33, is accommodated in a space defined by the actuator housing 30 and the yoke 32. A bottomed cylindrical bearing 36 is fit within a cylindrical portion 32a of the yoke 32 and within an inner periphery of the annular coil 34. A disk-shaped armature 38 is slidably supported on an inner peripheral surface of the actuator housing 30 and opposite an upper surface of the coil 34. A step 38a formed on an inner periphery of the armature 38 is engaged with an upper portion of the bearing 36. The armature 38 is biased upwards by a spring 42, such as a Belleville-type spring, disposed between the armature 38 and an upper surface of the bobbin 33, and positioned to engage a locking portion 30a provided on the actuator housing 30.

A cylindrical slider 43 is slidably fitted to an inner periphery of the bearing 36, and a shaft portion 20a, which extends downward from the movable member 20, is connected to a boss 44, which is passed loosely through an upper bottom of the bearing and fixed within the slider 43. A coil spring 41 is disposed between the bearing 36 and the slider 43, wherein the bearing 36 is biased upward and the slider 43 is biased downward by the coil spring 41.

When the coil 34 of the actuator 29 is in a de-excited state, a resilient force of the coil spring 41 is applied downward to the slider 43 slidably supported on the bearing 36, and a resilient force of a coil spring 45 disposed between the slider 43 and a bottom surface of the yoke 32 is applied upward to the slider 43. Thus, the slider 43 is stopped at a location where the resilient forces of the coil springs 41 and 45 are balanced with each other. When the coil 34 is excited and attracts the armature 38 downward, the step 38a pushes the bearing 36 to slide downward, wherein the coil spring 41 is compressed. As a result, the resilient force of the coil spring 41 is increased, wherein the slider 43 descends while compressing the coil spring 45. Therefore, the movable member 20, connected to the slider 43 through the boss 44 and the shaft portion 20a, is lowered, and the second elastic member 18, connected to the movable member 20, is deformed downward to increase the volume of the first liquid chamber 24. On the other hand, when the coil 34 is de-excited, the movable member 20 is raised, and the second elastic member 18 is deformed upward to decrease the volume of the first liquid chamber 24.

Thus, when the first elastic member 14 is deformed from a load input by the engine E, the volume of the first liquid chamber 24 changes as an engine shake vibration of low frequency is generated during traveling of the automobile, and the liquid flows between the first liquid chamber 24 and the second liquid chamber 25, which are connected to each other via the upper orifice 26 and the lower orifice 27. When the volume of the first liquid chamber 24 is increased or decreased, the volume of the second liquid chamber 25 correspondingly decreases or increases. Also, the change in volume of the second liquid chamber 25 is absorbed by the resilient deformation of the diaphragm 22. At this time, the vibration transmitted from the engine E to the vehicle body frame F is effectively damped because the shapes and sizes of the upper orifice 26 and the lower orifice 27, as well as the spring constant of the first elastic member 14, are set to exhibit a lower spring constant and a higher damping force in a range of the frequency of the engine shake vibration.

In the range of the frequency of the engine shake vibration, the actuator 29 is maintained in a non-operational state.

When a vibration having a frequency higher than the engine shake vibration, i.e., a vibration during idling due to the rotation of the crankshaft of the engine E or a vibration during suspension of the cylinders is generated, the liquid in the upper orifice 26 and the lower orifice 27 connecting the first liquid chamber 24 and the second liquid chamber 25 to each other is brought into a stick state, wherein the anti-vibration function is not exhibited. For this reason, the actuator 29 is driven to exhibit an anti-vibration function.

Figure 5:
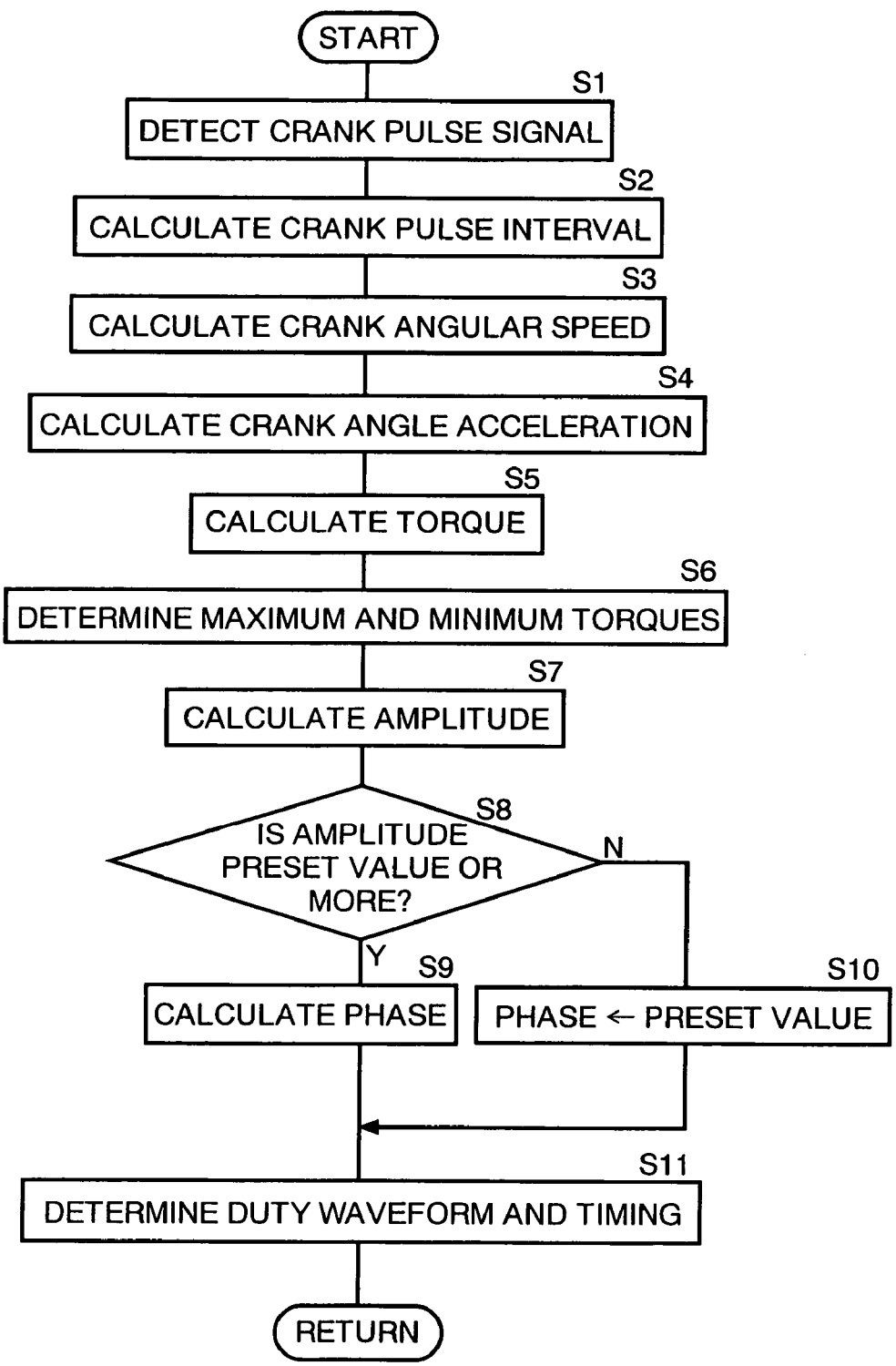
FIG. 5 is a flow chart showing a technique for controlling an actuator.

To exhibit the anti-vibration function by the actuator 29, the electronic control unit U controls the supply of electric current to the coil 34 based on a signal from the crank pulse sensor S. The contents of such control will be described in detail below with reference to a flowchart in FIG. 5.

First, a crank pulse output from the crank pulse sensor S for every crank angle of 10° is read at Step S1. A time interval of the crank pulse is calculated at Step S2 by comparing the read crank pulse with a reference crank pulse, i.e., a particular cylinder TDC signal. Then, a crank angular speed ω is calculated by dividing the crank angle of 10° by the time interval of the crank pulse at Step S3. A crank angle acceleration dω/dt is calculated at Step S4 by differentiating the crank angular speed ω by time. In Step S5, a torque Tq around the crankshaft of the engine E is calculated according to the following equation:

$$Tq = I \times d\omega/dt$$

wherein I is an inertia moment around the crankshaft of the engine E. Provided the crankshaft is being rotated at a constant angular speed ω, the torque Tq is 0 (zero). However, during an expansion stroke, the angular speed ω is increased due to an acceleration of a piston, and during a compression stroke, the angular speed ω is decreased due to a deceleration of the piston, wherein a crank angle acceleration dω/dt is generated, and a torque Tq proportional to the crank angle acceleration dω/dt is generated.

A maximum value and a minimum value of the torque adjacent each other in terms of time are determined at Step S6. An amplitude in the position of the active anti-vibration supporting device M supporting the engine E is calculated as a difference between the maximum and minimum values of the torque, namely, an amount of fluctuation in torque is calculated at Step S7.

The amplitude corresponds to the magnitude of the vibration of the engine according to the present invention. If the amplitude is equal to or larger than a preset value at Step S8, a phase of the vibration of the engine is calculated at Step S9. The phase of the vibration of the engine is calculated from the crank angle provided when the torque attains a maximum value. On the other hand, if the amplitude is smaller than the preset value at Step S8, the phase of the vibration of the engine is fixed at a preset value at Step S10. A duty waveform and a timing, i.e., a phase, of electric current applied to the coil 34 of the actuator 29 are determined based on the calculated magnitude of the engine vibration and the calculated phase of the engine vibration (or a preset phase of the engine vibration) at Step S11.

Therefore, when the engine E is offset downward due to vibration, the volume of the first liquid chamber 24 is decreased to increase the liquid pressure, and the coil 34 is excited to attract the armature 38. As a result, the armature 38 is moved downward along with the slider 43 and the movable member 20, while compressing the coil springs 41 and 45, wherein the second elastic member 18, which is connected at an inner periphery to the movable member 20, is deformed downward. As a result, the volume of the first liquid chamber 24 increases to suppress an increase in liquid pressure and hence, the active anti-vibration supporting device M generates an active supporting force to prevent the downward transmission of a load from the engine E to the vehicle body frame F.

On the other hand, when the engine E is offset upward, the volume of the first liquid chamber 24 is increased to decrease the liquid pressure, and the coil 34 is de-excited to cancel the attraction of the armature 38. As a result, the armature 38 is moved upward along with the slider 43 and the movable member 20 by the resilient forces of the coil springs 41 and 45, wherein the second elastic member 18, which is connected at an inner periphery to the movable member 20, is deformed upward. As a result, the volume of the first liquid chamber 24 decreases to suppress a decrease in liquid pressure and hence, the active anti-vibration supporting device M generates an active supporting force to prevent the upward transmission of the load from the engine E to the vehicle body frame F.

As described above, the magnitude and phase of the engine vibration are presumed from the crank pulse of the engine E detected by the crank pulse sensor S. Also, the electric current applied to the coil 34 of the actuator 29 is controlled based on the presumed magnitude and pressured phase of the engine vibration. Therefore, the active anti-vibration supporting device M exhibits an effective anti-vibration performance without being influenced by a variation in vibration characteristics of various engines or by a change in vibration characteristics due to the long-term use of the engine E.

When the presumed engine vibration is smaller, a variation in torque is also smaller. For this reason, the accuracy of the presumed phase of the engine vibration from the phase at which the torque assumes a maximum value is decreased, so that it is difficult to appropriately control the actuator 29. In this case, however, the actuator 29 is controlled based on the presumed magnitude of the engine vibration and the preset phase of the engine vibration. As such, even when it is difficult to presume the phase of the engine vibration, the actuator 29 is appropriately controlled, and the effective anti-vibration performance is exhibited by the active anti-vibration supporting device M.

Figure 6:
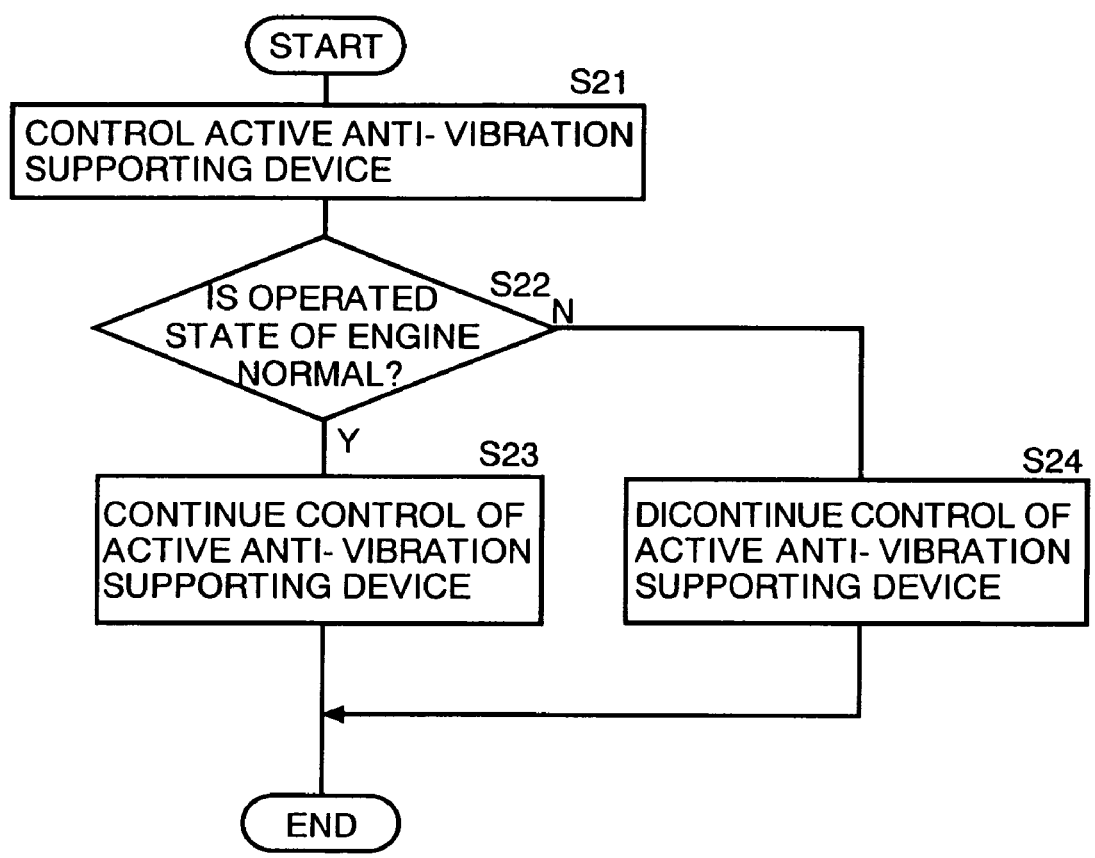
FIG. 6 is a flowchart showing a technique for controlling the active anti-vibration supporting device when an abnormality is generated during an operational state of an engine.

Now, if the operational state of the engine E is normal at Step S22 in the flowchart of FIG. 6 during the control of the active anti-vibration supporting device M, the control of the active anti-vibration supporting device M is continued at Step S23. On the other hand, if an abnormality is generated in the operational state of the engine E at Step S22, the control of the active anti-vibration supporting device M is discontinued.

Thus, the active anti-vibration supporting device M is prevented from being operated uselessly in a state incapable of suppressing a large vibration of the engine E with an abnormality generated therein, and it is possible to previously avoid a situation in which the actuator 29 needlessly consumes electric power, and a situation in which the load of the active anti-vibration supporting device M is increased leading to a reduced durability.

The abnormality in the operated state of the engine E includes, for example, an abnormality in a cylinder-stopping mechanism. The detection of such an abnormality is carried out by monitoring a cylinder-suspension switchover hydraulic pressure by a hydraulic pressure sensor, or by monitoring the wire breaking of a hydraulic pressure switchover solenoid valve.

If the operated state of the active anti-vibration supporting device M is normal at Step S32 in the flowchart of FIG. 7 during the control of the active anti-vibration supporting device M at Step S31, the control of the active anti-vibration supporting device M is continued at Step S33. On the other hand, when an abnormality is generated in the operational state of the active anti-vibration supporting device M at Step S32, if the engine E is in a cylinder-suspended state at Step S34, the cylinder-suspended state is canceled at Step S35, wherein the engine E is restored to an all-cylinder operational state. If the engine E is not in the cylinder-suspended state at Step S34, the switchover to the cylinder-suspended state is prohibited.

Thus, in a state in which an abnormality is generated in the active anti-vibration supporting device M, wherein a sufficient anti-vibration function cannot be exhibited, it is possible to previously prevent the engine E from being brought into the cylinder-suspended state in which the vibration of the engine E is increased, thereby preventing increases in noise and vibration.

The abnormality in the operated state of the active anti-vibration supporting device M includes, for example, abnormalities in the actuator 29 and the electronic control unit U. The detection of such abnormality is carried out by monitoring the magnitude of electric current flowing through the actuator 29, or by monitoring the wire breaking based on a voltage in each of signal wires for the electronic control unit U.

Although the preferred embodiment of the present invention has been described in detail, it will be understood that the present invention is not limited to the above-described embodiment, and various modifications in design may be made without departing from the subject matter of the invention defined in the attached claims.

For example, the active anti-vibration supporting device M for supporting the engine E of the automobile has been illustrated in the embodiment, but the active anti-vibration supporting device M according to the present invention is applicable to the supporting of any engine, not just for the engine of an automobile.

What is claimed is:

1. An anti-vibration support system for a cylinder-suspendable engine, comprising an active anti-vibration supporting device including
    an elastic member adapted to receive vibration of the engine;
    a liquid chamber, wherein at least a portion of a wall surface of said liquid chamber is defined by said elastic member;
    a movable member adapted to change a volume of said liquid chamber; and
    an actuator that uses an electromagnetic force to drive said movable member,
    wherein the vibration of the engine is prevented from being transmitted to a vehicle body frame by controlling a supply of electric current to said actuator, and
    wherein when an abnormality in an operational state of said active anti-vibration supporting device is detected,
        if the engine is in a cylinder-suspended state, the cylinder suspension of the engine is prohibited and the engine restored to a state where all cylinders are operating, and
        if the engine is not in a cylinder-suspended state, switching to the cylinder-suspended state is prohibited.

2. The anti-vibration support system according to claim 1, wherein said elastic member is formed from rubber.

3. The anti-vibration support system according to claim 1, wherein said movable member is vertically movable and includes a shaft portion extending into said actuator.

4. The anti-vibration support system according to claim 1, wherein said actuator includes an outer shell defined by an actuator housing.

5. The anti-vibration support system according to claim 4, wherein a yoke is fixed to a lower portion of said actuator housing and a coil is accommodated within a space defined by said actuator housing and said yoke.

6. The anti-vibration support system according to claim 5, wherein a disk-shaped armature is slidably supported on an inner peripheral surface of said actuator housing and opposite an upper surface of said coil.

7. The anti-vibration support system according to claim 6, wherein a biasing member is disposed between said armature and an upper portion of a bobbin around which said coil is wound and biases said armature upward.

8. The anti-vibration support system according to claim 7, wherein a cylindrical slider is slidably fitted within a cylindrical portion of said yoke and includes a boss to which said shaft portion of said movable member is connected.

9. The anti-vibration support system according to claim 8, wherein a cylindrical bearing is slidably fitted between said cylindrical portion of said yoke and said cylindrical slider.

10. The anti-vibration support system according to claim 9, wherein a coiled biasing member is disposed between said cylindrical bearing and said cylindrical slider, and about said shaft portion of said movable member, and wherein said coiled biasing member biases said cylindrical bearing and said cylindrical slider in respective opposite directions.

11. The anti-vibration support system according to claim 1, wherein the abnormality in the operational state of said active anti-vibration supporting device is an abnormality in the actuator.

12. The anti-vibration support system according to claim 1, wherein an electronic control unit is provided and controls the supply of electric current to said actuator and the abnormality in the operational state of said active anti-vibration supporting device is an abnormality in the electronic control unit.

* * * * *